United States Patent [19]

Hansen

[11] Patent Number: 5,049,890
[45] Date of Patent: Sep. 17, 1991

[54] SAMPLED DATA PROCESSING

[75] Inventor: James P. Hansen, Waldorf, Md.

[73] Assignee: The United States of America as represented by the Secretary of the Navy, Washington, D.C.

[21] Appl. No.: 508,774

[22] Filed: Sep. 23, 1974

[51] Int. Cl.$^5$ .......................... G01S 3/16; G01S 3/28
[52] U.S. Cl. ..................................... 342/384; 342/378
[58] Field of Search .................. 343/100 LE, 100 CL; 325/473, 474; 342/384, 378

[56] References Cited

U.S. PATENT DOCUMENTS 3,202,990  8/1965  Howells ........................ 343/100 CL
3,727,220  4/1973  Brennan et al. ..................... 343/7.7
3,763,490 10/1973  Hadley et al. ................ 343/100 LE Primary Examiner—Theodore M. Blum
Attorney, Agent, or Firm—Thomas E. McDonnell; George A. Montanye

[57] ABSTRACT

An improved signal processing system and technique for preprocessing auxiliary data signals by sequential decorrelation, particularly for use in systems employing adaptive canceller loops. Each of a plurality of signal channels sample the environment of a plurality of signal sources and provide inputs to a configuration of adaptive canceller loops. The loops are connected such that an adaptive loop decorrelates the signal from two signal channels to form a preprocessed signal, and each of the remaining adaptive loops are sequentially connected such that each auxiliary channel signal is decorrelated from the preprocessed signal of the previous adaptive loop until all signal channels have been utilized. In a side-lobe canceller system each of the preprocessed outputs is used to form an auxiliary sample input to a main channel canceller loop to cancel interference in the receiving system. By using the preprocessed signals as the auxiliary input, a receiving system can significantly increase interference cancellation and reduce the number of iterations required.

11 Claims, 2 Drawing Sheets

SAMPLED DATA PROCESSING

BACKGROUND OF THE INVENTION

The present invention relates to improvements in signal processing systems and more particularly to improved techniques and devices for providing decorrelated samples from a multiple signal environment.

Generally, signal processing systems are designed to reduce the presence of undesired signals in a signal receiving system. As is known, in particular systems, such as a radar system, the characteristics of the receiving antenna are such that undesired signals which are received in the antenna side-lobes interfere with the isolation of the target signal received in the main lobe. Accordingly, to isolate the main lobe signals, side-lobe cancellers using adaptive canceller loops have been used to cancel interference from the sidelobes of the main radar antenna as exampled by Paul W. Howells U.S. Pat. No. 3,202,990.

Conventionally, receiving systems employing adaptive loops have used auxiliary receivers to sample the environment in which a desired signal may be present. Each auxiliary signal forms an input which is used by an adaptive canceller loop in an attempt to eliminate undesired (interference) signals which may be present in conjunction with the desired signal in a main channel. Each adaptive loop attempts to decorrelate the main channel signal from its auxiliary input signal by first phase shifting and amplitude weighting the auxiliary input and then subtracting this modified auxiliary signal from the main channel.

Such systems as described above, work well to eliminate main channel interference with a single adaptive loop when only one interference source is present. However, when multiple interference sources are involved, conventional systems have been ineffective in reducing cancellation even though multiple adaptive loops have been used. In theory, if N independent interference sources are present in a signal environment, the interference signals may be cancelled from the desired signal by multiple adaptive loops fed by input from N separate auxiliary receivers. In practice, however, it has been found that effective cancellation cannot be obtained unless the auxiliary signal inputs are relatively independent of one another, in order to prevent the reintroduction of cancelled signals common in conventional systems. In addition, conventional systems using parallel connected adaptive loops have exhibited instabilities at the gains required for effective cancellation, and insufficient cancellation when constructed and operated over practically obtainable dynamic range In copending U.S. applications 499,260 and 499,374 entitled "IMPROVED SIDELOBE CANCELLER SYSTEM" to Bernard L. Lewis and Irwin D. Olin and "MODIFIED SIDELOBE CANCELLER SYSTEM" to Bernard L. Lewis, filed in the United States on Aug. 16, 1974, and assigned to the same assignee as the present application, iterative systems are disclosed which increase the cancellation over that of conventional systems. These techniques, however, require many iterative loops, with each loop requiring multiple adaptive loops, before complete cancellation can be obtained.

In a copending U.S. application No. 499,357 entitled "ADAPTIVE SIDELOBE CANCELLER SYSTEM" to Bernard L. Lewis, filed in the United States on Aug. 16, 1974, and assigned to the same assignee as the present application, a system is disclosed which preprocesses the auxiliary signals to provide a plurality of independent samples which are then used in the main channel canceller system to cancel interference. The system as disclosed, however, requires that each auxiliary signal be decorrelated from every other auxiliary signal to form the independent samples. Since a single adaptive canceller loop can only decorrelate its output from one other auxiliary channel, multiple sequences of adaptive canceller loops connected in a series or parallel configuration are necessary before complete cancellation can be obtained. In addition, repeated iterations in series configurations are necessary before the output becomes independent of the particular sequence of inputs used, while a parallel configuration suffers from the typical problems of loop instability and restricted data input.

Accordingly, the present invention has been developed to overcome the specific shortcomings of the above known and similar techniques and to provide decorrelated input samples, particularly for use in a side-lobe canceller system.

SUMMARY OF THE INVENTION

It is therefore an object of the present invention to provide a signal processing system for preprocessing samples of a signal environment.

Another object of the invention is to provide a system for preprocessing auxiliary signals using adaptive canceller loops.

A further object of the invention is to provide a canceller system for sequentially decorrelating the signals from a plurality of inputs.

Still another object of the invention is to provide an adaptive canceller system which preprocesses auxiliary signals using a minimal number of adaptive loops.

A still further object of the invention is to provide a preprocessing side-lobe canceller system that produces a sequence of signals after a few circulations whose effect in cancellation is relatively independent of the original order of auxiliary inputs used.

Still another object of the invention is to provide a side-lobe canceller system that automatically optimizes the preprocessed signal order to produce maximum cancellation with fewer iterations.

Yet another object of the invention is to provide a sidelobe canceller that is easily expandable to accomodate any number of auxiliary inputs from a multiple interference source environment.

In order to accomplish the above and other objects, the invention provides a unique preprocessing system for providing a plurality of independent samples from a multiple source environment. In the present invention, each of a plurality of independent receiving channels are connected to receive signals from an equal number of signal sources forming the signal environment, and each of the channels is connected to provide an input to an independent adaptive canceller loop. The loops are connected to form a first circulation such that a first adaptive loop decorrelates the signal from first and second signal channels to form a preprocessed signal. Each of the remaining adaptive loops are sequentially connected such that each channel input is decorrelated from the preprocessed signal of the previous adaptive loop until all channel signals have been utilized to complete a first circulation. The same channel inputs are then used in the same order and manner as the first circulation to sequentially decorrelate the channel inputs from the last preprocessed output of the first circulation. In a canceller system, the signal output from the first independent channel and all the sequentially decorrelated outputs are used as independent sample inputs to a primary canceller system. Each group of adaptive loops of the primary canceller system receiving the independent sample inputs of one circulation is called an iteration, and as many iterations can be used as needed to provide complete cancellation. Since each sample input is decorrelated from the previous sample input throughout each circulation, the primary canceller system tends to operate on the main channel signal without cancelling similar components or reintroducing similar components so common to prior art systems. The result is that effective cancellation can be obtained after relatively few circulations when the number of independent receiving channels (auxiliary) equals or exceeds the number of signal sources (jammers) forming the signal environment.

Other objects, advantages, and novel features of the invention will become apparent from the following detailed description of the invention when considered with the accompanying drawings wherein:

DETAILED DESCRIPTION OF A PREFERRED EMBODIMENT

Figure 1:
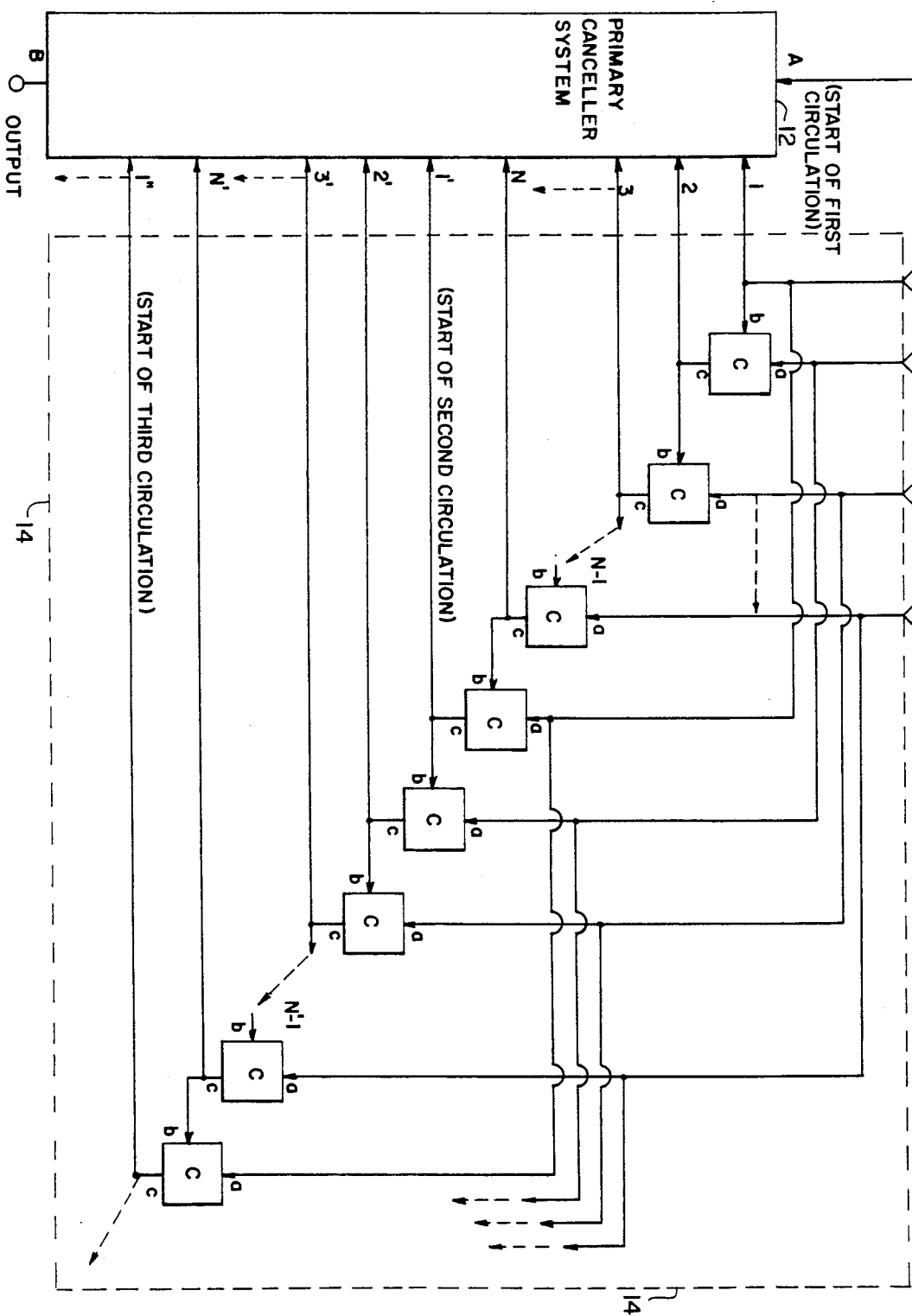
FIG. 1 is a schematic diagram showing a preferred embodiment of the preprocessing and canceller system according to the present invention.

Referring now to FIG. 1, a schematic diagram shows a preferred embodiment of the preprocessing and canceller system according to the present invention. In the present example, the invention will be described with reference to a radar system although the inventive teachings are equally applicable to other types of signal processing systems. Generally, the system includes a main receiving channel in the form of a directional radar antenna 11 and a plurality of independent auxiliary receiving channels in the form of omnidirectional antennas 1, 2, 3, . . . N. While the system being described only refers to the main antenna as a receiving antenna, the antenna could just as well be modified in a conventional manner to both transmit and receive. The main radar antenna 11 forms the main channel for receiving radar signals and any interference that may be present from the side-lobes. Auxiliary antennas 1, 2, 3, . . . N receive primarily interference and form the independent receiving channels for sampling the interference from a plurality of signal sources forming the environment in which a radar is attempting to operate. For simplicity, the radar and auxiliary receivers have been omitted in the drawing since they contribute nothing to the inventive principle, it being obvious that such receivers are incorporated to receive and process the antenna signals in a manner well-known in the art. The signals at antennas 1, 2, 3, . . . N after passing through the auxiliary receivers (not shown) are coupled to form the preprocessing system 14 as shown. Each of the auxiliary channels are coupled to an adaptive canceller loop C, as shown, which loops are all of conventional construction as will be discussed with reference to FIG. 3. The preprocessing system is constructed to provide preprocessed auxiliary sample outputs labeled 1, 2, 3, . . . N, 1', 2', 3', . . . N, 1'' . . . etc. As can be seen, the preprocessed auxiliary sample 1 is taken at an output terminal to be the unaltered auxiliary signal from auxiliary channel 1. The preprocessed auxiliary sample 2 is then formed by coupling the second auxiliary channel 2 to an adaptive canceller loop C at input a along with the signal from auxiliary channel 1 at b. The signal from auxiliary channel 1 acts to decorrelate the output of the canceller loop at c from its input at h to produce the preprocessed auxiliary sample 2. Preprocessed auxiliary sample 3 is then formed by coupling auxiliary channel 3 at a and the preprocessed auxiliary sample 2 at b of the next adaptive loop, to provide the decorrelated preprocessed auxiliary sample 3 at output c. In a like manner, this sequence is continued until the $N^{th}$ auxiliary channel signal has been decorrelated by the preprocessed signal $N-1$ to form the preprocessed auxiliary sample N. Each of the preprocessed auxiliary samples 1, 2, 3, . . . N form the independent sample inputs to the primary canceller system with the sequence of N inputs being called a first circulation. In a manner similar to the first circulation, a second circulation can be obtained to produce a second sequence of preprocessed auxiliary signals labeled in the drawing as 1', 2', 3', . . . N'. Using the $N^{th}$ preprocessed auxiliary sample of the first circulation as the input to b of an adaptive loop, and the auxiliary channel 1 coupled as input at a, the 1' preprocessed sample of a second circulation can be formed at c. This sequence is again continued using the auxiliary channel inputs in the same order to produce the decorrelated output of each adaptive loop which forms the preprocessed auxiliary sample. In a like manner, a third or as many additional circulations as desired could be constructed to provide additional sequences of preprocessed auxiliary samples.

Figure 2:
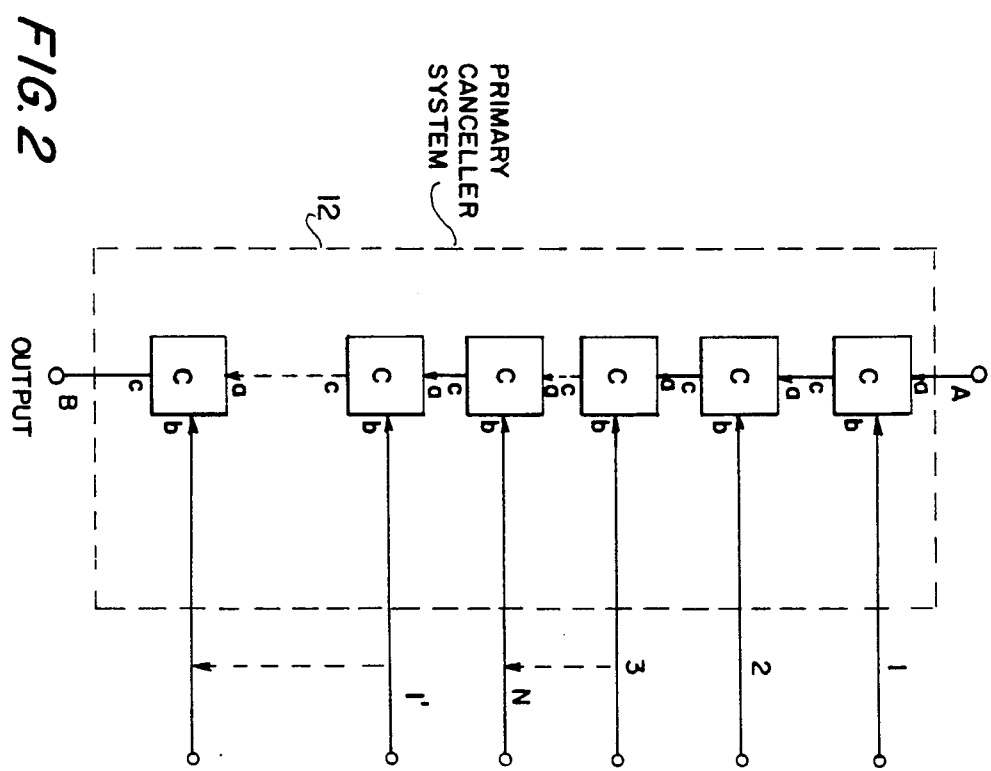
FIG. 2 is a schematic diagram showing a serially connected embodiment of a primary canceller system used in the system of FIG. 1.

In the main channel, the signals at 11, after passing through the radar receiver (not shown) are coupled to the primary canceller system 12 at input A. While the primary canceller system could be a conventional parallel connected canceller loop using the preprocessed auxiliary samples as the auxiliary inputs, it is preferred that the system 12 be constructed as a sequence of serially connected independent adaptive loops to provide for maximum cancellation. Such a system is shown in FIG. 2 where the main channel signal from radar antenna 11 is coupled at A to the primary canceller system. The system is composed of a plurality of independent adaptive loops C with the output c of each previous loop being coupled to the input a of the next succeeding loop. The main channel input A is taken as the input a to the first loop of the sequence while the output c of the last loop in the sequence is taken as the main radar output B. Each of the preprocessed auxiliary samples are in turn used in the particular order shown as the independent sample inputs to the respective loops of the primary series. As is known, the samples at b decorrelate the signal at a to produce the output c which in turn is used as the input to the next succeeding loop of the primary system until all preprocessed auxiliary samples 1, 2, 3, . . . N have been used. When more than one circulation is used to supply the preprocessed auxiliary signals, each series of adaptive loops in the primary system, receiving the N preprocessed auxiliary samples of each circulation, is called an iteration. If more than one iteration is used, the primary system can be a serial iterative system as disclosed by U.S. application No. 499,260 which operates in the manner as described therein to cancel interference in the main channel. In a like manner, a plurality of circulations could be used to provide preprocessed auxiliary inputs to a parallel iterative system as disclosed in U.S. application No. 499,374, to also cancel interference in the main channel.

Figure 3:
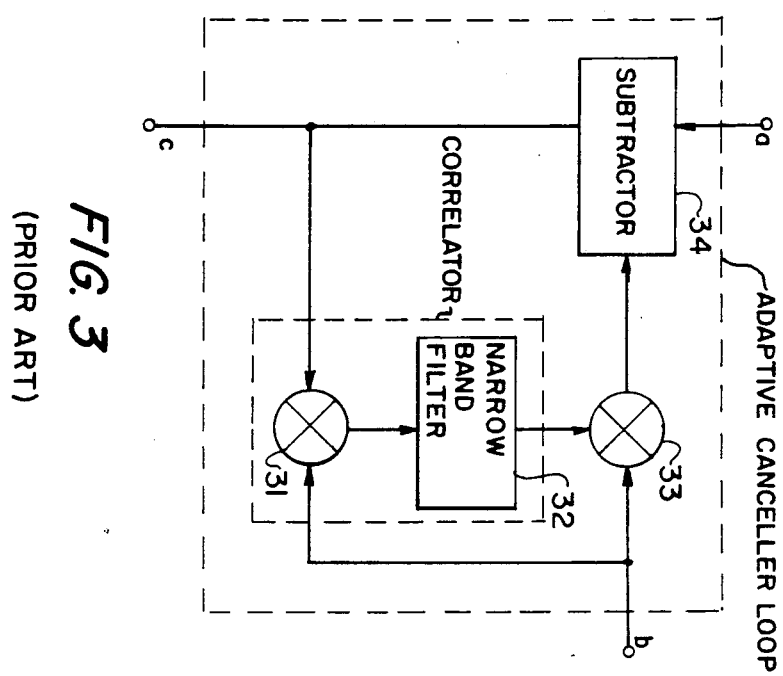
FIG. 3 is a schematic diagram showing the elements constituting one form of conventional adaptive loop.

Turning now to FIG. 3, a common adaptive canceller loop is shown as an example of an adaptive loop that might be used as the loops C of the present invention. The construction and operation of such an adaptive canceller loop is well-known as taught by the patent to Howells U.S. Pat. No. 3,202,990, reference to which is hereby made, and will therefore not be described in great detail. Generally, however, the adaptive canceller loop is constructed to have inputs at a and b which correspond to those inputs a and b of the adaptive loops of FIGS. 1 and 2. A subtractor 34 is coupled to receive the input a while its output is coupled along with input b to mixer 31. The output of mixer 31 is coupled through narrow band filter 32 and then to a mixer 33 where it is combined with the input from b. The output of mixer 33 is then coupled back to subtractor 34 where it is subtracted from the input at a to form the loop output at c. As is well-known, the mixer 31 and narrow band filter 32 form a correlator which produces a weighting function designed to equalize the phase and amplitude of the signal input at b in mixer 33, to decorrelate the signal out of subtractor 34. As is also known, since the speed of response of the adaptive loop is proportional to loop gain, and since loop gain is proportional to average power input, a loop will tend to cancel signals such as interference signals having high average power, while being relatively insensitive to signals such as radar returns. While the particular adaptive loop of FIG. 3 has been referred to by way of example, it should be realized that any known adaptive loop, designed for decorrelating signals, could be used in its place. In the present example, it is also obvious that if the particularly illustrated adaptive loop of FIG. 3 is used to form the adaptive loops of the present invention, the additionally required structure for filtering and off-setting signal frequencies, as taught by Howells, must also be provided.

The operation of the inventive system will now be described with reference to FIG. 1 and 2. When a plurality of signal sources (in this case, jammers or other interference sources) are present, the signal received by the radar antenna 11 includes a radar signal carrier modulated by the radar signal, and a plurality of jammer carriers having the same frequency, but different amplitude and phase, modulated by the jammer waveforms. Each of the auxiliary receiving antennas 1, 2, 3, ... N sample the environment in which the radar is attempting to operate and provide auxiliary channel signals to the preprocessing system 14 as previously described. Since each antenna receives signals form a plurality of jammers the auxiliary channel signals are not independent of one another and in conventional systems prevent effective cancellation of interference signals in the main channel. According to the present invention, however, each of the auxiliary channel signals of antennas 1, 2, 3, ... N are coupled to the preprocessing system 14 to provide a plurality of preprocessed outputs as has been previously described. Since each preprocessed auxiliary sample 1, 2, 3, ... N, 1', 2', 3', ... N', 1'' ... etc. is an interference signal decorrelated from the previous preprocessed signal, each preprocessed auxiliary sample forms an auxiliary interference sample independent of all the other samples.

In the side-lobe canceller, according to the present invention, each of these independent auxiliary samples are then used as input to the primary canceller system 12 to cancel interference in the main channel signal. Again, the adaptive loops of the primary system are conventional adaptive canceller loops which decorrelate the output of each adaptive loop with the preprocessed auxiliary sample inputs at b. However, contrary to prior art practice, each adaptive loop C of the primary system is independent and serially connected as shown by FIG. 2. Each adaptive loop therefore operates to decorrelate its output from one of the independent auxiliary samples using the main channel signal as the initial loop input at A. Since the preprocessed auxiliary samples constitute all parts of the interference in the main channel, the successive operation of each adaptive loop on the output residue of the previous adaptive loop in the primary system 12 allows complete cancellation of interference from the main radar signal at B.

In contrast to the prior art systems where each loop operated in parallel on the entire signal from each auxiliary channel, and in the process allowed one loop to introduce components taken out by another loop, the present invention provides independent signal components that only allows each adaptive loop of the primary system to decorrelate using those independent components. By thereby avoiding the introduction of opposing components, the present technique provides improved cancellation with substantially fewer iterations than systems as described in U.S. application Nos. 499,260 and 499,374. In addition, since the independent preprocessed auxiliary samples constitute all the information necessary for successive decorrelation in the primary system 12, complete cancellation can be obtained for at least as many jamming signals as there are auxiliary channel receiving antennas. In a case where the number of jamming sources exceeds the number of auxiliary channel receivers, improved cancellation will still be obtained over known systems with less circulations and iterations. Further since the present preprocessing system only attempts to decorrelate one auxiliary channel signal from a single preprocessed sample, the present system requires fewer adaptive loops and iterations than in systems such as disclosed in U.S. application No. 499,357.

In a simulated test of the present system it was found that complete cancellation can usually be obtained using only two circulations of the preprocessed signals. In addition, it was found that the total effect of the preprocessing system was to generate a sequence of preprocessed auxiliary samples whose effect in the primary canceller system was relatively independent of the original order of auxiliary channel use, and whose order was automatically optimized to produce maximum cancellation in the first iteration of the primary system.

From the above disclosure it is clear that the present invention provides many advantages over known systems. Using only conventional adaptive loops, the interference signals from a plurality of independent receiving channels can be preprocessed to be independent of one another. These preprocessed signals can in turn be used as auxiliary inputs to a side-lobe canceller system using serially connected adaptive loops. This results in a canceller system that provides optimum cancellation for a plurality of interference signals while still exhibiting fast loop settling times, in contrast to conventional parallel loop connections where recirculation in the parallel loops takes longer and provides less effective cancellation. The present system can additionally be expanded to deal with any number of auxiliary channels while lending itself to integrated circuit techniques to reduce the cost of construction. All of these are new features that are not found in conventional systems as previously noted.

While the invention has been described with particular reference to a radar system, the preprocessing technique is obviously applicable to any data processing system which uses multiple samples to solve or eliminate multiple independent variables.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A system for preprocessing desired and undesired signals of a multiple signal environment comprising:
   a plurality of independent channel means for receiving signals from a multiple signal environment and providing a plurality of output signals;
   an output terminal coupled to provide one of said independent channel means output signals as an unaltered first independent preprocessed auxiliary sample; and
   second means coupled to said output terminal and each of the remaining independent channel means for sequentially decorrelating each remaining independent channel means output signal to form a plurality of independent preprocessed auxiliary samples as a first circulation, said second means being constructed to decorrelate each independent channel means output signal of the sequence from a prior preprocessed auxiliary sample to form one of said plurality of independent preprocessed auxiliary samples wherein said first independent preprocessed auxiliary sample forms said prior preprocessed auxiliary sample for decorrelating the first independent channel means output signal of the sequence and each preceeding independent preprocessed auxiliary sample of the sequence forms said prior preprocessed auxiliary sample for decorrelating the next succeeding independent channel means output signal of the sequence.

2. The system of claim 1 further including at least one third means coupled to said second means and each of said independent channel means for sequentially decorrelating each independent channel means output signal to form a plurality of independent preprocessed auxiliary samples forming at least one additional circulation, said at least one third means being constructed to decorrelate each independent channel means output signal from a previous preprocessed auxiliary sample to form one of said plurality of independent preprocessed auxiliary samples of said at least one additional circulation wherein an input of one of said independent preprocessed auxiliary samples of said first circulation forms said previous preprocessed auxiliary sample for decorrelating the first independent channel means output signal of the sequence of said at least one additional circulation and each preceeding independent preprocessed auxiliary sample of said at least one additional circulation sequence forms said previous preprocessed auxiliary sample for decorrelating the next succeeding independent channel means output signal of said at least one additional circulation sequence.

3. The system of claim 2 wherein N channel means are coupled to produce N independent preprocessed auxiliary samples in each circulation and wherein the $N^{th}$ preprocessed auxiliary sample of the first circulation is coupled as the input preprocessed auxiliary sample of said at least one additional circulation.

4. The system of claim 3 wherein said at least one third means comprises a plurality of third means sequentially coupled with each of said plurality of third means forming an additional circulation having N preprocessed auxiliary sample outputs and the $N^{th}$ preprocessed auxiliary sample of each circulation forming the preprocessed auxiliary sample input to the next circulation.

5. The system of claim 4 wherein the output of each channel means in each of said circulations is coupled to be decorrelated in the same sequential order as the order in all other circulations.

6. The system of claim 5 wherein each of said second and third means comprises a plurality of sequentially coupled adaptive canceller loops with each of said loops coupled to receive a first input from one of said channel means and a second input from a preceeding preprocessed auxiliary sample and provide a decorrelated output representing one of said preprocessed auxiliary samples.

7. The system of claim 6 wherein each of said channel means includes an antenna for receiving said signals from the multiple signal environment.

8. The system of claim 1 further including:
   a main channel mean for receiving desired and undesired signals from the multiple signal environment and providing a main channel signal; and
   adaptive means coupled to said main channel means and said first and second means for decorrelating the undesired signals in said main channel signal with each of said preprocessed auxiliary samples to reduce the undesired signals in the main channel signal.

9. The system of claim 8 wherein said adaptive means comprises a plurality of adaptive canceller loops with each loop coupled to receive a first input from said main channel signal and a second input from one of said preprocessed auxiliary samples and provide a decorrelated output representing the main channel signal reduced in undesired signals.

10. The system of claim 9 wherein the main channel signal from said main channel means is coupled as a first input to one of the canceller loops of said adaptive means and the remaining canceller loops are sequentially connected such that the output from the preceeding canceller loop is coupled as the main channel Signal input of the next succeeding canceller loop for all loops of said adaptive means.

11. The system of claim 10 wherein said main channel means includes a directional antenna for receiving said desired and undesired signals and said plurality of independent channel means each include an omnidirectional antenna for receiving primarily undesired signals from said multiple signal environment.

* * * * *